United States Patent [19]

Gebauer et al.

[11] 4,178,277
[45] Dec. 11, 1979

[54] MODIFIED POLYESTERS

[75] Inventors: Peter Gebauer; Wilhelm Kaufer; Herbert Klinkenberg; Hilde Söntgerath, all of Troisdorf, Fed. Rep. of Germany

[73] Assignee: Dynamit Nobel Aktiengesellschaft, Troisdorf, Fed. Rep. of Germany

[21] Appl. No.: 915,474

[22] Filed: Jun. 14, 1978

[30] Foreign Application Priority Data

Jun. 18, 1977 [DE] Fed. Rep. of Germany ....... 2727486

[51] Int. Cl.$^2$ ...................... C08L 67/02; C08G 63/76
[52] U.S. Cl. ................................... 260/40 R; 528/291; 525/437
[58] Field of Search .............. 528/273, 291; 260/40 R

[56] References Cited
U.S. PATENT DOCUMENTS

| | | | |
|---|---|---|---|
| 3,850,880 | 11/1974 | Hakanson et al. | 528/273 X |
| 3,900,446 | 8/1975 | McClung et al. | 528/273 X |
| 4,022,752 | 5/1977 | Horn et al. | 528/273 X |
| 4,024,307 | 5/1977 | Brahm et al. | 528/273 X |
| 4,085,086 | 4/1978 | Mizuno et al. | 528/273 X |

Primary Examiner—Lucille M. Phynes
Attorney, Agent, or Firm—Sprung, Felfe, Horn, Lynch & Kramer

[57] ABSTRACT

A modified polyester composition comprising the condensation product of terephthalic acid or a polyester-forming derivative thereof and a diol, said polyester having an arithmetical mean molecular weight $\overline{M}_n$ or more than 17,000, a carboxyl equivalent of at least 10 mVal/kg, a nitrogen content of less than 0.4 weight percent and urethane groups linked linearly to said polyester; a process for preparing such modified polyester and a molding composition comprising such modified polyester and an additive, suitably a filler and in particular glass fibers.

34 Claims, No Drawings

MODIFIED POLYESTERS

BACKGROUND OF THE INVENTION

1. Field of the Invention

The invention relates to modified polyesters which are derived from terephthalic acid or their polyester-forming derivatives and aliphatic diols, preferably those having 3 to 8 carbon atoms, particularly polytetramethylene terephthalate.

2. Discussion of the Prior Art

The invention relates furthermore to a method of preparing modified thermoplastic polyesters, and to molding compositions containing such polyesters.

Thermoplastic molding compositions polyalkylene terephthalates are used in the production of high-quality moldings by the various thermoplastic forming methods, such as injection molding, extrusion and the like. Polytetramethylene terephthalate (PTMT) has acquired special importance. The crystallization characteristics of this product make it possible to fabricate it at desirable low temperatures and economical high output rates.

PTMT is prepared, as a rule, by known methods of polycondensation. In the conventional processes of preparation, except for transesterification catalysts, generally no other additives are put in, so that the polymeric end product contains only residues of these catalysts. The thermoplastic polyesters thus made can be fabricated by the conventional methods, preferably in injection molding and extruding machines. During the fabrication, the molten molding composition is exposed to a more or less severe thermal oxidation due to heat and the presence of oxygen, which expresses itself in a loss of molecular weight and the concomitant loss in the overall quality of the finished articles.

These losses have an especially detrimental effect on the characteristics most important in construction material, namely toughness and rigidity. It is a known measure to add to polyalkylene terephthalates of high molecular weight stabilizing compounds and/or toughness-improving, polymeric, thermoplastic additives, either during fabrication or in a separate incorporating process preceding fabrication.

It is also known to add isocyanates to polyethylene terephthalate (PETP) of high molecular weight. The isocyanates produce a stabilizing action, so that the molecular degradation produced by thermal stress during the fabrication of the high-molecular PETP into injection molded articles is compensated, preserving the properties of the pure PETP (cf. DL Pat. No. 78,381).

These procedures, however, are not satisfactory in actual practice. Improved toughness, for example, is achieved at the expense of an undesirable loss of rigidity. The stabilizers generally have no direct effect on the mechanical characteristics, since all they do is reduce the molecular degradation of the polyesters during the incorporation of the additives and during fabrication.

It is indeed possible by increasing the molecular weight in the preparation of the thermoplastic polyesters to raise the level of the characteristics of the products made therefrom, but their melt viscosity is also increased, and a higher mass temperature is required in the compounding and fabrication, so that the greater amount of work which must be performed in plasticizing them and the longer cycle time combine to place limits on the economy of manufacture of molded products.

In addition, the preparation of polyesters of high molecular weight is very expensive. It is known that, in the preparation of PTMT, mild polycondensation conditions must be maintained, since otherwise thermal damage is done to the polyesters even during the polycondensation, which manifests itself in impairment of the mechanical properties of the products made from them.

It has therefore been proposed to interrupt the polycondensation in the melt at low reduced viscosities of, for example, 0.9 dl/g, and to cure these polycondensates in the solid phase in an additional process step so as to achieve the desired higher reduced viscosity (cf., e.g., *Kunststoffe* 66 (1976) 10, p. 611, col. 1, par. 2 sqq.). For this purpose, however, reaction times amounting to hours are required, which makes the preparation of polyesters of high molecular weight, especially PTMT, very uneconomical.

OBJECT OF THE INVENTION

It is the object of the invention to provide thermoplastic polyesters of high molecular weight, especially polytetramethylene terephthalate, which can be fabricated easily into articles of high rigidity combined with great toughness. It is a further object of the invention to provide a method for the economical preparation of thermoplastic polyesters of high molecular weight or of molding compositions containing such polyesters.

SUMMARY OF THE INVENTION

These objects are achieved in accordance with the invention by polyesters which are derived from terephthalic acid or its polyester-forming derivatives and aliphatic diols, preferably those having 3 to 8 carbon atoms, especially polytetramethylene terephthalate, which is characterized by numerical average molecular weights ($\overline{M}_n$) greater than 17000, preferably greater than 23000, and especially greater than 29000, carboxyl equivalents equal to or greater than 10 mVal/kg, and a nitrogen content of less than 0.4, preferably less than 0.2% by weight, which arises, at least predominantly, from urethane groups incorporated in a linear chain-like manner into the polyester.

By the term "polyester forming derivatives" there is contemplated the corresponding ester, especially the $C_{1-4}$ alkyl ester, the corresponding acid halide, e.g., terephthalyl chloride and in some cases, the corresponding anhydride. It is intended to cover those monomers heretofore used to form polymers by condensation with a polyol.

These new polyesters are characterized by the fact that the urethane groups are derived from diisocyanates of low molecular weight. Suitable diisocyanates have the formula O=C=N—R—N=C=O. R can be an alkylene moiety, e.g., one having 1 to 6 C atoms or a mono- or polynuclear, preferably dinuclear, arylene moiety having 6 to 12 carbocyclic C atoms which can have one or more substituents. Substituents are those which produce no detrimental effect on the polyester during preparation or fabrication, examples being low alkyl groups, e.g. 1 to 6 C atom, preferably methyl groups, or phenyl groups or, for example, O-alkyl groups. If R is a dinuclear aromatic moiety, the rings can be annulated or they can be joined together either by an alkylene group, such as a methylene group, or directly. The NCO groups are preferably in the 4,4' position (in the case of dinuclear diisocyanates). In the case of mononuclear diisocyanates the NCO groups are generally in the meta position in relation to one another and are linked to the nucleus directly or by an alkylene group, e.g., of 1 to 6 C atoms, preferably, such as methylene group. If substituents are present, they are preferably in the ortho position in relation to at least one of the NCO groups. R can thus be, for example, a diphenylmethane moiety or a xylylene moiety or a phenylene moiety, the muclei being able to substituted as described above.

The following are given as examples: hexamethylene diisocyanate, 4,4'-diisocyanatodiphenyl, 4,4'-diisocyanato-3,3'-dimethoxydiphenyl, 4,4'-diisocyanato-3,3'-dimethyldiphenyl, 4,4'-diisocyanato-3,3'-diphenyl-diphenyl, 4,4'-diisocyanatodiphenylmethane, 4,4'-diisocyanato-3,3'-dimethyldiphenylmethane, 1,5-diisocyanatonaphthaline, toluylenediisocyanate (2,4 and/or 2,6-diisocyanatotoluene), m-xylylene diisocyanate. The diisocyanates can be used individually or in mixtures. The preferred diisocyanate is 4,4'-diisocyanato-diphenylmethane. The new modified polyesters are substantially uncrosslinked and thermoplastic. They are characterized in that they are soluble in a mixture of phenol and 1,1,2,2-tetrachloroethane (60:40 by volume, from which it is apparent that there is virtually no crosslinking. Their solubility in such mixture at 25° C. is between >0 and at least 10 grams per liter of solvent. Said 10 grams per liter are the normally used concentration in determining the reduced viscosity. The molecular weight of the diisocyanates employed is in the range of 168 to 500, preferably 168 to 388.

Another characteristic of the modified polyesters of the invention is their polymolecularity index, which is 2.0 to 5.0, preferably 2.5 to 4.5.

The polymolecularity index (Q) is determined by the equation, $$Q = \overline{M}_w / \overline{M}_n$$

in which $\overline{M}_w$ represents the mean weight and $\overline{M}_n$ represents the arithmetical mean of the molecular weight. The molecular weights are determined by gel chromatography in a Waters GPC-200 apparatus. The specimens are dissolved at 110° C. in a 1:1 mixture of m-cresol and chlorobenzene to form an 0.5% solution, and they are tested at room temperature. The polymolecularity index gives information as to the breadth of the molecular weight distribution.

Another characteristic of the modified polyesters in accordance with the invention is that their content of nitrogen bound in the macromolecule and originating from the installed urethane groups is less than 0.4, preferably less than 0.2%, by weight. The urethane groups are formed in the polyesters of the invention by the reaction of di-isocyanates with the terminal hydroxyl groups of the polyesters used as reaction components. The carboxyl group content of the polyesters used as starting material remains substantially unchanged.

The fact that the reaction takes place only through hydroxyl groups is surprising and could not have been expected since it is known that when acid groups are reacted with isocyanate groups there results foam formation with release of carbon dioxide. In the performance of the process of the invention, however, no foaming takes place. Even in the case of starting polyesters containing almost exclusively acid terminal groups, no reaction takes place, surprisingly, with the NCO groups of the diisocyanates in the process of the invention. In such a case, due to the nearly complete absence of hydroxyl terminal groups, there is also no increase or a no more than insignificant increase in the molecular weight (see Example 4).

Further subject matter of the invention is a process for the preparation of modified polyesters which are derived from terephthalic acid or its polyester-forming derivatives and aliphatic glycols, preferably those having 3 to 8 carbon atoms, especially polytetramethylene terephthalate, which is characterized by the fact that polyesters having arithmetical mean molecular weights of more than 8000, preferably beginning at 16000, and carboxyl equivalents equal to or greater than 10 mVal/kg, are reacted with diisocyanates in the plastic state, preferably in the molten state. Generally the polyester used for the reaction with the isocyanate has a maximum arithmatical mean molecular weight of 40,000. Preferably it is no higher than 35,000.

The starting polyesters which are to be used as reaction components in accordance with the invention, are to be capable of reaction. In general, polyesters having carboxyl equivalents of as much as about 90 mVal/kg, are capable of reaction, although those are preferred which have carboxyl equivalents of less than 90 mVal/kg, for example, 10 to 70 mVal/kg.

The carboxyl equivalent is determined by determining the carboxyl number. The carboxyl number is defined by the amount of KOH in milligrams per gram of polyester, which is necessary in order to neutralize the carboxyl terminal groups of the polyester being tested. This method of determination is described, for example, by H. A. Pohl in Anal. Chem. 1954, Vol. 26, pp. 1614 to 1616.

The diisocyanates are used in such amount that the content of bound nitrogen in the end product is less than 0.4 wt.-%, preferably less than 0.2 wt.-%.

The nitrogen content is determined, for example, by means of the Rapid-N ® fast determination analyzer, which is obtainable from the Mettler Instrument Corporation in the U.S.A. The nitrogen determination with this apparatus is described, for example, by Dr. Wolfgang Merz in the periodical International Laboratory, March/April, 1974, under the title, "An automatic instrument for rapid determination of nitrogen in commercial materials."

In general, the ratio of admixture of the reactants is governed by the reactivity of the starting polyesters. The reaction between the starting polyesters and diisocyanate takes place through the terminal hydroxyl groups of the starting polyesters.

To determine the ratios between the reactants, it is desirable to use the hydroxyl number of the starting polyester. The hydroxyl number is defined by the amount of potassium hydroxide in milligrams which is necessary in order to saponify the acetate formed from one gram of polyester. One method for the analytic determination of the hydroxyl number is given, for example, in DIN (Deutsche Industries Norm) standard 16945. Each hydroxyl group requires an isocyanate group for the reaction. From this it appears that 0.0303 g of hydroxyl group requires 0.075 g of NCO groups for the reaction. The NCO consumption in grams for 100 grams of hydroxyl-group-containing starting polyesters can be determined by the following equation:

$$\frac{7.5 \times \text{OH number}}{\text{NCO content of the diisocyanate in \%}} \quad (1)$$

The NCO content of the diisocyanates is given as a characteristic value by the manufacturer. For example, the NCO content of 4,4'-diphenylmethane diisocyanate is 31%. For 100 grams of a starting polyester having a hydroxyl number of 6, 1.45 g of diisocyanate is needed for the stoichiometric reaction with 4,4'-diphenylmethane diisocyanate in accordance with the above equation.

It is preferred to operate with stoichiometric amounts of diisocyanates. Fundamentally, however, the use of less than stoichiometric amounts or excess amounts of diisocyanate is not to be excluded. The optimum amounts can be determined, if desired, by preliminary experiment. The reaction takes place in the process of the invention such that, during the passage through the reaction apparatus, the polyesters of high molecular weight of the invention are formed by the reaction of bifunctional isocyanates with the terminal groups of the starting polyester by polyaddition, with the formation of urethane groups. Substantially uncrosslinked polyesters of high molecular weight are formed, having polymolecularity indices of 2.0 to 5.0 and nitrogen contents of less than 0.4 weight-percent, preferably less than 0.2 weight-percent.

By the method of the invention, reduced viscosities of, for example, 3.0 dl/g can be achieved in extremely short reaction times.

In general, starting polyesters are used which have a molecular weight that is lower than that of the modified polyester. It is preferable to use mixtures of starting polyesters of different molecular weights which generally are lower than the molecular weight of the modified polyester. In this manner an especially good set of characteristics can be obtained in the fabricated end product.

One can also, however, use starting polyester mixtures in which the one component has a lower molecular weight than the end product and the other component has a higher molecular weight than the end product.

By the method of the invention it is thus easy to produce in a repeatable and controlled manner a very specific desired combination of properties in the molding compositions or in the fabricated products. For example, polyesters having reduced viscosities from about 1.3 dl/g to 1.7 dl/g can be made which are particularly well suited for injection molding compositions.

However, higher molecular weight polyester are also useful. For example, if one sets out from a starting polyester having a reduced viscosity of 0.9 dl/g corresponding to an arithmetical means molecular weight of approximately 17,000, one can by the method of the invention establish within a period of 2 to 10 minutes a reduced viscosity of 3.0 dl/g, which corresponds to an arithmetical mean molecular weight of about 62,500, the molecular weight being thus elevated by about 360% within an extremely short period. In the conventional methods of preparing polyalkylene terephthalates one can achieve such an increase in the molecular weight only with great technical effort involving very long reaction times.

Between the experimentally determined arithmetical mean molecular weights and the measured reduced viscosities the following equation has been found:

$$\eta red = 1.04 \times 10^{-4} \times \overline{M}_n^{0.93} \quad (2)$$

The reduced viscosity $\eta red$ is measured in a solution of 1% by weight in a mixture of 60 weight-parts of phenol and 40 weight-parts of 1,1,2,2-tetrachloroethane at 25° C., and computed by the following formula:

$$\eta red = \frac{\frac{t_1}{t_{1m}} - 1}{c} \; dl/g \quad (3)$$

in which $t_1$ is the pouring time of the solution, $t_{1m}$ the pouring time of the solvent and c the concentration of the solution.

The hydroxyl numbers of the starting polyesters are generally less than 15, preferably less than 7. The starting polyesters are accordingly not polyester prepolymers in the conventional meaning of the term, such as are known in the preparation of polyurethane.

The reactive starting polyesters used as reaction components in accordance with the invention can be made in a conventional manner, preferably by the transesterification of a dialkyl or diaryl ester of terephthalic acid, especially dimethyl terephthalate, with a diol, followed by condensation in the presence of suitable catalysts.

For example, dimethyl terephthalate and the diol in a molar ratio of 1:1.1 to 1:1.5, preferably 1:1.2 to 1:1.4, plus a catalyst, especially butyl titanate or tetraoctylene glycol titanate, are transesterified in a kettle at standard pressure in the temperature range from, for example, 150° to 180° C. until the rate of methanol distillation drops off. To begin condensation, the material is displaced into a second kettle and the excess diol is driven off at a higher temperature and a corresponding vacuum until the desired degree of condensation has been reached.

The starting polyesters derived from terephthalic acid or its polyester-forming derivatives and aliphatic diols are to be understood to include copolyesters, preferably those copolyesters in which 50 or more mol percent of the acid component consists of terephthalic acid or its polyester-forming derivatives. Examples of the co-acids are aliphatic, cycloaliphatic or aromatic dicarboxylic acids or their polyester-forming derivatives, such as adipic acid, azelaic acid, sebacic acid, dodecane diacid, cyclohexane-dicarboxylic acid, and isophthalic acid. Examples of the diols are those of 2 to 10 carbon atoms, such as ethylene glycol, neopentyl glycol, cyclohexanedimethanol, isomers of hexanediol or at octanediol, individually or in mixtures.

A preferred starting polyester is polytetramethylene terephthalate (PTMT). Also to be understood as PTMT are those polyesters in which a part of the butanediol-1,4, in an amount of 50 wt.-% or less, preferably of 20 wt.-%, is replaced by one or more other diols, and/or in which a part of the terephthalic acid or its polyester-forming derivatives, amounting to 50 wt.-% or less, preferably to no more than 20 wt.-%, is replaced by one or more other, dicarboxylic acids or their polyester-forming derivatives. The co-acids or co-diols are those named above.

Preferred starting polyesters are homopolyesters on the basis of terephthalic acid, especially on the basis of dimethyl terephthalate, and butanediol-1,4.

The starting PTMT can be prepared as described above.

An especially delicate method of preparing starting polyesters for use in accordance with the invention is described in Ser. No. 751,916 filed Dec. 16, 1976, entitled Method and Apparatus for the Preparation of Polycondensate, assigned to the assignee hereof, the disclosure of which is hereby incorporated herein by reference. In this procedure, precondensates prepared preferably continuously and having molecular condensation degrees of, for example, 3, are polycondensed in the molten state in a special reactor with removal of the cleavage products by the application of a vacuum, the reaction mass being exposed to the reaction conditions in a thin layer by means of a stirrer. The molten polycondensate thus continuously prepared and taken out of the reactor can then be introduced continuously, for example, into a screw cylinder or double screw cylinder, for example, with the proportioned infeeding of the diisocyanate reaction component plus additives, if any, such fillers and/or strengthening materials and/or stabilizers and/or lubricants and/or dyes and/or pigments or other adjuvants, and then extruded in the form of a strand, preferably through perforated plates, and cooled and granulated. Molding compositions which contain the modified polyalkylene terephthalates as well as additives are additional subject matter of the invention.

In performing the reaction (condensation) of the starting polyester with the diisocyanate a temperature of between 120° and 300° C., preferably between 200° and 280° C. is maintained. While the process can be carried out at sub-atmospheric pressures as well as super atmospheric pressures, the process is more conveniently carried out at atmospheric pressure. Generally, pressures from <1 bar up to 1500 bar can be employed.

Generally, the reaction is effected for a period of time of between 0.3 and 30 minutes, preferably 0.5 to 15 minutes, with time and temperature being somewhat inversely proportioned. The extent to which the reaction mass is mixed or washed also effects the duration of the process. Generally, the same is effected until the resultant polyester has an arithmetical mean molecular weight $\overline{M}_n$ of more than 17,000.

The process is conveniently carried out in the melt or plastic state.

For the discontinuous preparation of the new modified polyesters or polyester molding compositions, however, conventional extruding machines, screw piston injection molding machines, or even kneaders, can be used as reaction apparatus. As a rule, no special additional apparatus is required for the control of the reaction, such as vacuum or shielding gas apparatus, and this simplifies the performance of the process.

The thoroughly dry starting polyester in the form of granules or powder is in that case loaded into the hopper of the reaction apparatus either separately or together with the amount of diisocyanate required for the reaction. Proportioning units controlled according to weight or volume can be used for the purpose of automatically controlling the quantity ratios and feeding the starting products to the reaction apparatus.

One can also premix the starting polyester and the diisocyanate batch-wise or continuously in mechanical mixing apparatus and feed the mixtures to the reaction apparatus either discontinuously or continuously.

It is furthermore possible first to plasticize the starting polyester and feed in the diisocyanate at a later time at an appropriate point by means of appropriate apparatus.

The additives, such as strengthening fillers, for example, preferably glass fibers, and the like, can either be premixed in the necessary ratio with the starting polyester and the diisocyanante before the reaction, or it can be proportioned into the reaction apparatus at various points or at various times.

An apparatus is described in German Patent Application No. P 27 06 755.6 the disclosure of which is hereby specifically incorporated herein by reference. In that application there is disclosed an apparatus which is especially suitable for the particularly gentle incorporation of glass fibers. In this apparatus a two-stage degassing screw extruder is provided. A premixing dome is disposed above the feed opening. In this remixing dome, the glass fibers are mixed with the plastic melt, the glass fibers and the plastic melt being fed continuously into the premixing dome by separate feeding apparatus. This mixture is fed to the extruder.

For the preparation of the glass fiber-reinforced molding compositions of the invention, the diisocyanates for the performance of the reaction are fed in at a suitable place.

Another suitable apparatus for preparing the polyesters or polyester molding compositions of the invention is the one described in said Ser. No. 751,916 discussed supra. This apparatus has a reactor housing having a horizontally or nearly horizontally disposed longitudinal axis, a stirrer rotatably disposed in the interior of the reactor and having stirring elements extending circumferentially and longitudinally, which are adapted to the internal shape of the housing, an inlet connection adjacent the one end of the reactor, and an outlet connection having at least one preferably vertically disposed output screw adjacent the other end, the cross section of the outlet connection flaring towards the interior of the reactor to an inlet funnel, and the reactor end of the output screw extending into this inlet funnel. A withdrawal opening for the cleavage products to be removed is not essential in the process of the invention, for no cleavage products are formed.

The polyesters or molding compositions of the invention can be fabricated by thermoplastic preliminary shaping methods, preferably by injection molding. The terms, polyesters and polyester molding compositions are to be understood also to apply to blends with other thermoplastics.

Particularly those molding compositions are involved which contain strengthening fillers along with any other conventional additives that may be desired. Strengthening fillers are, for example, glass spheres, glass powder, whiskers, asbestos fibers, carbon fibers, synthetic fibers, metal threads, metal chips, metal powder, or mixtures thereof, but preferably glass fibers. Examples of conventional additives are stabilizers, lubricants, dyes, pigments, nucleating agents, and the like.

The fillers are used in such an amount that the filler content of the overall composition amounts to from 2 to 80%, preferably 20 to 50%, by weight.

Glass fibers, which can be treated with adhesivizing agents for example, are preferred in lengths of around 6 millimeters, although longer or shorter glass fibers or rovings can be used.

The reaction of the starting polyesters with the diisocyanates is performed in the plastic, preferably in the molten state. It is desirable to provide for a maximum temperature at which no foaming occurs.

The time of stay of the reaction mixture in the reactor is generally substantially less than 60 minutes, depending on the reaction conditions selected. For example, it is from 0.50 minutes to 30 minutes, and preferably less than 15 minutes. The optimum time of stay depends on the reaction parameters and the desired end product.

Thus, in the practice of the method of the invention, the reaction time is extremely short in comparison to known methods. The parameters influencing the course of the reaction, such as the amount of diisocyanate, the time of stay, and the mass temperature, can be varied such that the course of the reaction can be influenced and regulated in a precise and repeatable manner.

Thus, for example, in a conventional single-screw extruding machine having a screw diameter D of 30 mm and a screw length of 20×D, the reaction of a starting PTMT of a reduced viscosity of 0.9 dl/g, corresponding to an arithmetical mean molecular weight of 17000, and having a content of 1.75 wt.-% of 4,4'-diphenylmethane diisocyanate, at a mass temperature of 260° C. and a time of stay of 2 minutes 50 seconds, produces a reduced viscosity of 1.66 dl/g, corresponding to an arithmetical mean molecular weight of 32500, and a time of stay of 45 seconds produces a reduced viscocity of 1.42 dl/g, corresponding to an arithmetical mean molecular weight of 27500.

When the reaction process is completed, the melt is either fabricated directly by injection molding, for example, or it is ejected in the form of strands from the reaction apparatus. After emerging from the die, it is desirable that the strands of material pass through a water or air cooling zone and then they can be comminuted by appropriate means into granules or powders ready for fabrication. One can also provide for granulation under water, a method wherein the emerging strands are cut off directly at the end of the die by a revolving knife under a steady stream of water and are carried by the stream of water to other treatments, such as drying, for example.

A typical procedure pursuant to the invention for the preparation of the new modified polyesters or polyester molding compositions is as follows: First the amount of diisocyanate that is required for the reaction is determined on the basis of the characteristics of the starting polyester and of the diisocyanate that is to be used. Then the starting components, including the additives, are premixed in the calculated ratio in a tumble mixer, and then they are put into the feed hopper of an extruder. The extruding parameters, mass temperature and time are adjusted in accordance with the molecular weight that is to be produced. The mass temperature is adjusted through heating zones in the extruder barrel and regulated by automatic heat input controls. The timing is controlled by the rotatory speed of the screw. The melt is discharged in strand form through a multiperforated die into a water bath and an air blowing zone for cooling, and then it is chopped in a strand granulator into cylindrical granules, which are then dried.

The method of the invention permits an extremely fast, energy-saving and therefore economical preparation of polyesters and polyester molding compositions as well as molded products, with the elimination of several steps which have been necessary in the state of the art.

The fluidity of the modified polyesters and polyester molding compositions of the invention is extremely good. On the basis of their good melt fluidity, energy can be saved by the fact that the molding pressure in injection molding machines can be kept considerably lower than it can in the injection molding of unmodified polyesters of comparable reduced viscosity or, conversely, a substantially longer flow path or substantially higher wall thickness ratios can be achieved at comparable injection pressures. This makes possible the production of complex moldings involving long flow paths or high flow resistances.

Another advantage is that the moldings are easy to strip out of the dies and they have smooth surfaces.

It is surprising that products of improved rigidity and simultaneously improved toughness can be produced from the polyesters or polyester molding compositions modified in accordance with the invention, in spite of a comparatively broad molecular weight distribution as indicated by the polymolecularity index. This outcome could not have been foreseen, and it could not have been deduced from the state of the art.

Neither could it have been foreseen that the thermal stability of the polyesters of the invention is surprisingly good. In studies made in this regard, by thermogravimetric analysis, for example (see Table 2), in contrast to polyesters which had been made in accordance with the state of the art, no loss of thermal stability was observed. On the other hand, thermoplastic linear polyurethanes are known to be very sensitive to thermal stress.

It is furthermore surprising that moldings made from the polyesters or polyester molding compositions of the invention are distinguished by an especially favorable mechanical performance under protracted stress (see Examples 5 and 6, Table 3).

The term rigidity, as used herein, refers to the modulus of elasticity determined by the tensile test pursuant to DIN 53 457, which has a decided effect on the deformation values, i.e., the deformation under stress, for comparable cross sections of components.

The toughness is defined by the impact toughness and notch impact toughness pursuant to DIN 53 453. The higher these values are, the better is the performance of moldings under impact or shock stress.

In order to more fully illustrate the nature of the invention and the manner of practicing the same, the following examples are presented:

EXAMPLES

PRIOR ART EXAMPLE 1

PTMT polyester prepared by polycondensation and having a reduced viscosity $n_{red}$ of 0.9 dl/g, corresponding to an arithmetical mean molecular weight of 17000 was cured in the solid phase after granulation, until the reduced viscosity was 1.52 dl/g, corresponding to an arithmetical mean molecular weight of 29200. The granules were injection molded in a Krauss-Maffei Model 150-600 screw piston injection molding machine to form DIN test specimens.

The averages of $\overline{M}_w$ and $\overline{M}_n$ required for the calculation of the polymolecularity index were determined by gel chromatography in the manner described. $\overline{M}_n$ was found to be 29200, and $\overline{M}_w$ 58000, resulting in a polymolecularity index Q=1.98. The granules were found, by the above-described method of determination, to contain no nitrogen. The barrel temperatures in the injection molding machine were set up as follows (hopper to die): 250°, 250°, 255°, 260° C. This resulted in a mass temperature of 260° C. The surface temperature of the test specimen die was 60° C. The screw barrel was equipped with a shut-off nozzle and a back-flow check, the screw diameter D was 45 mm, and the screw had a length of 20×D. The molding composition was drawn into the screw barrel at a screw rotatory speed of 80 rpm. The back pressure during the plastification was 100 bars. Upon completion of the plastification of the volume required for the filling of the die, the molding composition was injected into the mold at a pressure of 850 bars. The dwell pressure was 850 bars, and the dwell time was 20 seconds. The cooling time was 50 seconds, and the total cycle time amounted to one minute ten seconds.

When the test specimens held together by the gate, sprues and runners were stripped from the die, thus forming a single "tree," sticking was encountered in the center of the standard test specimens of DIN 53 453. This was due to the fact that, when the die was made, the cavities for the standard small test specimens were given twice the length of the DIN standard, so that two test specimens could be taken from a single die cavity. The ejector pins were able to be located only at the ends of the specimens for design reasons, and the tolerances prescribed by DIN 53 453 did not permit any increase of draft to facilitate stripping. The mechanical characteristics given in Table 1 were determined in accordance with DIN 53 457 and DIN 53 453 on shouldered speciens and standard small specimens.

The thermal stability of the granules used was determined by thermogravimetric analysis. For this purpose the granules were tested not only at a constant heating rate of 8° C. per minute until the weight loss amounted to 20%, but also by subjecting them to a uniform temperature of 300° C. for up to 60 minutes. The results of the tests are given in Table 2. The test apparatus was a Mettler Thermoanalyzer.

PRIOR ART EXAMPLE 2

30 weight-percent of glass staple fibers were incorporated into a PTMT polyester having a reduced viscosity of 1.7 dl/g, corresponding to an arithmetical mean molecular weight of 33500, using a single screw extruder, in a conventional manner. The granules prepared in this manner had a reduced viscosity of 1.50 dl/g corresponding to an arithmetical mean molecular weight of 29000 after the incorporation of the glass fibers. These granules were made into DIN test specimens in the same injection molding machine described in Prior Art Example 1, using the same injection molding die.

The polymolecularity index was determined to be Q=1.9. No nitrogen content could be detected in the granules.

The barrel temperatures in the injection molding machine were as follows (hopper to die): 240°, 240°, 245°, 265° C. The mass temperature was 270° C. The die temperature was regulated at 60° C. The screw speed during the plastification was 80 rpm. The head pressure was 150 bars. The melt was injected into the die at a pressure of 1000 bars. The dwell pressure was 1000 bars, and the dwell time 20 seconds. The cooling time was 50 seconds, and the total cycle time was 1 minute 10 seconds.

The stripping difficulty was less, due to the greater rigidity of the specimens in comparison with Prior Art Example 1. The characteristics given in Table 1 were determined by means of shouldered specimens and standard small specimens.

EXAMPLE 1

An unreinforced PTMT polyester was made by the method of the invention in a Reifenhauser Model S 60 single-screw extruder.

The starting product was a polytetramethylene terephthalate prepared by the polycondensation method described herein, which had a reduced viscosity of 0.9 dl/g, corresponding to an arithmetical mean molecular weight of 17000. This product had a hydroxyl number of 7.36. The carboxyl equivalent was 44 m Val-COOH/kg. The isocyanate was 4,4'-diphenylmethane diisocyanate with an NCO content of 31%. According to Formula 1, the isocyanate requirement was 1.78 g per 100 g of polytetramethylene terephthalate. The granular starting product and the isocyanate were mixed batchwise in the calculated ratio in a tumble mixer and placed into the hopper of a single-screw extruder.

The screw diameter D was 60 mm, and the screw length amounted to 30×D. The screw as a three-zone screw of conventional design. The melt was put through a perforated die containing 7 holes inclined downwardly at an angle of 60°, so as to form strands passing first into a water bath, then being turned about and carried onto a conveyor belt against which a blast of air was directed. The conveyor belt carried the solidified strands to a granulator which chopped the strands into granules 3 to 4 mm long.

The plastifying action was regulated from the hopper area to the end of the die in eleven temperature control zones. Upon optimum production conditions, the following temperatures were measured by thermocouples from the hopper to the die: 245°, 256°, 256°, 257°, 256°, 225°, 255°, 276°, 278°, 280° C. At a screw speed of 80 rpm, the material throughput was 70.5 kg/h. The reduced viscosity of the end product was 1.51 dl/g, corresponding to an arithmetical average molecular weight of 29100.

The carboxyl equivalent was 45 mVal-COOH/kg. Accordingly, COOH groups did not participate in the reaction. The time of stay in the extruder amounted to 1.5 minutes. If the same starting product had been brought to this molecular weight by the solid-phase curing method, this would have required a period of about 15 to 18 hours. This, together with the considerably lower energy expended in the extruder, results in particularly economical production in comparison with solid-phase curing.

By the nitrogen determination method described above, the nitrogen content was determined to be 0.17 wt.-%, and the theoretical nitrogen level is 0.18 wt.-%.

Determination of the molecular weights $\overline{M}_n$ and $\overline{M}_w$ resulted in a polymolecularity index of 3.0.

The thermal stability of the granules was tested in the same manner as described in Prior-Art Example 1. The results are represented in Table 2.

The molding composition prepared in this manner was injection-molded to form test specimens in the same injection molding machine described in Prior-Art Example 1, under the conditions therein specified. The injection pressure in this case, however, could be reduced to 450. The specimens were stripped easily from the dies, and the sticking encountered in Prior-Art Example 1 did not occur. The cooling time could therefore be reduced to 40 seconds, resulting in a total cycle time of one minute.

The mechanical characteristics determined in the specimens are given in Table 1.

EXAMPLE 2

In a Reifenhauser Model R 30 single-screw extruder, an unreinforced PTMT polyester was prepared by the method of the invention.

The starting product was a PTMT polyester of high molecular weight having a reduced viscosity of 1.47 dl/g corresponding to an arithmetical mean molecular weight of 28800, and another PTMT polyester of low molecular weight having a reduced viscosity of 0.69 dl/g corresponding to an arithmetical mean molecular weight of 12600. 4,4'-diphenylmethane diisocyanate was used as the isocyanate. An isocyanate requirement of 1.01 g per 100 g of the starting components resulted.

The starting products were premixed with a ratio of 1:1 in a slowly running Papenmeier mixer and then mixed by hand in a tinplate canister with 4,4'-diphenylmethane diisocyanate in the stated ratio.

The screw diameter D of the extruder was 30 mm, and the screw length was 15×D. The screw was a conventional three-zone screw. The melt was extruded through a die having a round hole of 3 mm diameter. After emerging from the die, the extruded strand was carried on a conveyor belt on which it was cooled by compressed air, and it was chopped into granules 3 to 4 mm long in a strand granulator. The temperatures preset in the temperature controls were as follows from the hopper to the die: 230°, 230°, 240°, 240°, 245° C., and the mass temperature was 250° C. The screw speed was 80 rpm, and the total time of stay in the barrel was one minute. This resulted in a throughput of 4.8 kg/h. The granules had a reduced viscosity of 1.52 dl/g, corresponding to an arithmetical mean molecular weight of 29200. The polymolecularity index was found to be 3.0. The nitrogen content amounted to 0.14% by weight.

This molding composition was made into test specimens in the injection molding machine described in Prior Art Example 1, under the same conditions given therein. The injection pressure was 550 bars, the dwell pressure 550 bars and the dwell time 20 seconds. The cooling time was 25 seconds and the total cycle time was 50 seconds.

The mechanical properties found in the test specimens are listed in Table 1.

EXAMPLE 3

In the single-screw extruder described in Example 1 and the conveyor and granulator also described therein, a glass fiber reinforced PTMT polyester molding composition was prepared by the method of the invention. The starting product was the starting polyester described in Example 1 and 4,4'-diphenylmethane diisocyanate. Six-millimeter staple glass fibers treated with a silane compound as adhesivizer were used as the reinforcing filler. The glass fibers were added in a proportion of 30% by weight. The isocyanate was added to the stoichiometric ratio to the starting polyester as in Example 1. The starting products were mixed batch-wise in a concrete mixer and loaded into the feed hopper of the single-screw extruder. The temperature control zones were set at the following temperatures (hopper to nozzle): 268°, 271°, 278°, 279°, 282°, 239°, 286°, 294°, 293°, 295° C. The screw speed was 60 rpm, and the throughput was 69 kg/h. In the extruding operation the strands emerged from the die in an especially uniform and smooth manner. When glass fibers are incorporated without the addition of isocyanate, sometimes irregularly distributed, thickened and thinned zones develop in the strands, which can result in frequent breaking off of the strands. Also, such strands have rough surfaces due to protruding glass fibers.

The reduced viscosity of the modified PTMT polyester molding compositions amounted to 1.50 dl/g, corresponding to an arithmetical mean molecular weight of 29000. The polymolecularity index determined by the method described above was Q=3.5. The nitrogen content was determined to be 0.15% by weight.

Test specimens were injection molded from this molding composition as in Prior Art Example 2 under the same conditions. The injection molding pressure could be reduced to 800 bars, as could the dwell pressure. No stripping difficulties were encountered. The mechanical properties of the moldings are given in Table 1.

EXAMPLE 4

A glass fiber reinforced PTMT polyester molding composition was prepared in the same single-screw extruder as in Example 2 by the method of the invention.

The starting products were the PTMT with a reduced viscosity of 1.47 dl/g from Example 2, and a PTMT polyester of extremely low molecular weight having a reduced viscosity of 0.45 dl/g corresponding to an arithmetical mean molecular weight of 8000. When the two products were mixed in a weight ratio of 1:1 without the addition of diisocyanate and then extruded and granulated under the conditions described, the reduced viscosity found in the granules was 0.97 dl/g, corresponding to an arithmetical average molecular weight of 18200.

The starting products were mixed in a weight ratio of 1:1 with the addition of 1.43 wt.-% of 4,4'-diphenylmethane diisocyanate and placed in the supply hopper of a conveyor belt weight proportioner placed over the feed hopper of the extruder. A second conveyor belt weight proportioner was charged with the glass fibers of Example 3. The conveyor belt weight proportioners fed the mixture of PTMT and isocyanate on the one side and glass fibers on the other to the extruder, in a ratio of 70:30 by weight.

The heating zones were set for the following temperatures from the hopper to the die: 235°, 235°, 240°, 240°, 240° C., and the mass temperature was 260° C. The screw speed was 80 rpm, resulting in a time of stay of 1 minute 15 seconds. The material throughput was 4.0 kg/h.

The extruded strand was granulated as described in Example 2.

The molding composition had a reduced viscosity of 1.49 dl/g, corresponding to an arithmetical mean molecular weight of 28900. The nitrogen content of the molding composition was 0.1 wt.-%, and the polymolecularity index was 3.9. Test specimens were injection molded under the conditions described in Prior Art Example 2. The mechanical properties found in them are given in Table 1.

PRIOR ART EXAMPLE 3

The PTMT molding composition from Prior Art Example 1 was injection molded to form a flow spiral on the injection molding machine also described in Prior Art Example 1. Such flow spirals permit a judgment of the ability of thermoplastic molding compositions to flow. The width of the spiral mold was 20 mm, and the height 2 mm. The spiral mold allowed a total flow distance of 1100 mm.

The barrel temperatures of the injection molding machine were set as follows (hopper to nozzle): 250°, 250°, 255°, 260° C. This resulted in a mass temperature of 260°. The die temperature was 45° C. The molding composition was injected into the mold cluster with an injection pressure of 800 bars. The dwell pressure was 800 bars, and the dwell time 10 seconds. Under these conditions a flow path length of 430 mm was achieved.

EXAMPLE 5

The molding composition of the invention, from Example 1, was injection molded into flow spirals under the same conditions as described in Prior Art Example 3.

On account of the better fluidity of the molding composition, a flow path length of 610 mm was achieved in this case, which corresponds to an improvement of about 42%.

PRIOR ART EXAMPLE 4

In the single-screw extruder described in Example 2, and in the granulating system also described therein, a starting polyester of the reduced viscosity of 0.84 dl/g, corresponding to an arithmetical mean molecular weight of 15,500, and having a carboxyl equivalent of 112.5 mVal/kg, was used in the preparation of an unreinforced PTMT polyester by the addition of 4,4'-diphenylmethane diisocyanate. The isocyanate was added in an amount of 2.0% by weight. The bulk weight of the starting polyester in the form of a granulated strand amounted to 800 grams per liter.

The starting polyester and the isocyanate were premixed in a tinplate canister by hand and put into the feed hopper of the extruder. The temperatures of the heating bands were set as follows (hopper to die): 240°, 240°, 245°, 245°, 245° C.; the mass temperature resulting from this was 260° C. The screw speed was 60 rpm, and the time of stay was 2 minutes 30 seconds. The strand came out smooth and uniform and no foaming or bubbling occurred. The bulk weight of the granulated product was 802 g/l, and accordingly it was just about the same as the bulk weight of the starting polyester. The reduced viscosity of the granules was 0.92 g/l, corresponding to an arithmetical mean molecular weight of 17,600. The carboxyl equivalent of the granules was 110 mVal/kg. Accordingly, no reaction had taken place between acid terminal groups and isocyanate groups, nor had any increase been achieved in the molecular weight in the meaning of the invention.

PRIOR ART EXAMPLE 5

As described in Prior Art Example 2, 30 wt.-% of glass staple fibers were incorporated into PTMT polyester of a reduced viscosity of 1.58 dl/g. The reduced viscosity of the granulated end product was about 1.40 dl/g. This product was injection molded to form DIN test specimens. The fabrication conditions were the same as in Prior Art Example 2. The reduced viscosity determined in the specimens was 1.32 dl/g, corresponding to an arithmetical mean molecular weight of 25400.

The values for the ultimate tensile strength and elongation at rupture were determined on shouldered specimens pursuant to DIN 53,455, by the short method, at a rate of 50 mm/min. Furthermore, the test specimens were subjected to the static tensile test of DIN 53,444 at a temperature of 23° C., by applying a tensile load of 110 N/mm$^2$ until rupture occurred.

The results of these tests are given in Table 3.

EXAMPLE 6

In the single-screw extruder described in Example 2, a glass fiber reinforced PTMT polyester was prepared by the method of the invention.

The starting product was a polytetramethylene terephthalate prepared by the polycondensation method described above and having a reduced viscosity of 0.9 dl/g.

On the basis of the hydroxyl number of the starting polyester, which was 6.5, and the NCO content of 31% in the 4,4'-diphenylmethane diisocyanate, the diisocyanate requirement in accordance with Formula 1 is 1.57 g per 100 g of starting polyester.

The starting polyester and the diisocyanate were mixed by hand in a tinplate canister. The feeding of this mixture and the glass fibers into the extruder was performed in a weight ratio of 70:30 as described in Example 4. The preparation of the granules was performed under the conditions likewise described in Example 4.

The reduced viscosity of the granules was determined to be 1.39 dl/g. Under the conditions described in Example 3, DIN test specimens were prepared by injection molding. The reduced viscosity tested in these specimens was 1.31 dl/g, corresponding to an arithmetical mean molecular weight of 25,000. The tests described in Prior Art Example 5 were performed on shouldered specimens in accordance with DIN 53,455. The results are set forth in Table 3.

Table 1

|  | Test Std. | Unit | Prior Art Example 1 | Example 1 | Example 2 | Prior Art Example 2 | Example 3 | Example 4 |
|---|---|---|---|---|---|---|---|---|
| Red. Viscosity | — | dl/g | | | | | | |
| Granules | | | 1.52 | 1.51 | 1.52 | 1.50 | 1.50 | 1.49 |
| Molding | | | 1.42 | 1.40 | 1.43 | 1.46 | 1.42 | 1.41 |
| Glass Content | — | wt.-% | — | — | — | 30 | 30 | 30 |
| Tensional Modulus of Elasticity | DIN 53457 | N/mm$^2$ | 2600 | 2720 | 2820 | 10040 | 10150 | 10350 |
| Impact Toughness | DIN 53453 | kJ/m$^2$ | | | | | | |
| at + 23° C. | | | no rupture | no rupture | no rupture | 39.6 | 45.8 | 50.8 |
| at 0° C. | | | | | | 39.5 | 44.9 | 46.6 |
| Notch Impact Toughness | DIN 53453 | kJ/m$^2$ | | | | | | |
| at + 23° C. | | | 4.0 | 4.5 | 6.6 | 11.8 | 12.0 | 14.5 |

Table 1-continued

| | | | Mechanical Characteristics | | | | | |
|---|---|---|---|---|---|---|---|---|
| | Test Std. | Unit | Prior Art Example 1 | Example 1 | Example 2 | Prior Art Example 2 | Example 3 | Example 4 |
| at 0° C. | | | 4.0 | 4.8 | 5.9 | 11.6 | 11.8 | 14.6 |

Table 2

Thermogravimetric Tests

| 1. Constant heating rate in air at 8° C. per minute | 1% | 5% | 10% | 20% |
|---|---|---|---|---|
| Prior Art Example 1 | 352 | 370 | 379 | 388 |
| Example 1 | 358 | 374 | 383 | 389 |

| | Weight Losses in % | | |
|---|---|---|---|
| 2. Isothermal exposure to heat at 300° C. in air | 15 min 300° C. | 30 min 300° C. | 60 min 300° C. |
| Prior Art Example 1 | 0.2 | 0.7 | 3.0 |
| Example 1 | 0.5 | 0.9 | 2.3 |

Table 3

| | Test Standard | Unit | Prior Art Example 5 | Example 6 |
|---|---|---|---|---|
| Ultimate Tensile Strength | DIN 53,455 | N/mm² | 140 | 147 |
| Elongation at Rupture | DIN 53,455 | % | <2 | 3.2 |
| Time required for rupture at an applied tensile loading of 110 N/mm² | DIN 53,444 | h | 0.19 | 3.3 |

What is claimed is:

1. A modified polyester composition consisting essentially of the condensation product of a reaction mixture consisting essentially of a copolymer of terephthalic acid or a polyester forming derivative thereof, an aliphatic, cycloaliphatic or other aromatic dicarboxylic acid or its polyester forming derivative wherein the terephthalic acid or its polyester forming derivative comprises at least 50 mole percent based upon the combined amounts of acids or their polyester derivatives and a mixture of diols comprising at least 50 mole percent, based upon the combined amounts of diols, of butane diol-1,4, said copolymer having an arithmetical mean molecular weight $\overline{M}_n$ of more than 17,000 and up to 40,000, a carboxyl equivalent of at least 10 m Val/kg, a nitrogen content of less than 0.4 weight percent and urethane groups linked linearly to said copolymer.

2. A composition according to claim 1 which is substantially uncrosslinked.

3. A composition according to claim 2 wherein said modified polyester has an arithmetical mean molecular weight $\overline{M}_n$ of more than 23,000.

4. A composition according to claim 2 wherein said modified polyester has an arithmetical mean molecular weight $\overline{M}_n$ of more than 29,000.

5. A composition according to claim 2 which is the condensation product of said copolymer and a diisocyanate.

6. A composition according to claim 5 wherein said diisocyanate has a molecular weight of between 168 and 500.

7. A composition according to claim 5 wherein said modified polyester has a polymolecularity index of 2.0 to 5.0.

8. A composition according to claim 5 wherein said modified polyester has a polymolecularity index of 2.5 to 4.5.

9. A composition according to claim 5 wherein said modified polyester has a nitrogen content less than 0.2% by weight.

10. A composition according to claim 5 wherein said diisocyanate has the formula O=C=N—R—N=C=O wherein R is an alkylene moiety or a mono or polynuclear arylene moiety.

11. A composition according to claim 10 wherein said diisocyanate is selected from the group consisting of hexamethylene diisocyanate, 4,4'-diisocyanatodiphenyl, 4,4'-diisocyanato-3,3'-dimethoxydiphenyl, 4,4'-diisocyanato-3,3'-dimethylidiphenyl, 4,4'-diisocyanato-3,3'-diphenyl-diphenyl, 4,4'-diisocyanatodiphenylmethane, 4,4'-diisocyanato-3,3'-dimethylidiphenylmethane, 1,5-diisocyanatonaphthaline, toluylenediisocyanate (2,4 and/or 2,6-diisocyanatotoluene) and m-xylylene diisocyanate.

12. A composition according to claim 10 wherein said modified polyester is soluble in a 60:40 mixture of phenol and 1,1,2,2-tetrachloroethane.

13. A composition according to claim 10 wherein said modified polyester has a carboxyl content of up to 90 mVal/kg.

14. A composition according to claim 10 wherein said diol has 2 to 10 carbon atoms.

15. A composition according to claim 4 wherein said diol has 3 to 8 carbon atoms.

16. A composition according to claim 14 wherein said diol is selected from the group consisting of isomers of propylene glycol, ethylene glycol, isomer of butylene glycol, neopentyl glycol, cyclohexanedimethanol isomers of hexanediol and isomers of octanediol.

17. A composition according to claim 17 wherein said aliphatic, cycloaliphatic or aromatic dicarboxylic acid is adipic acid, azelaic acid, sebacic acid, dodecane diacid, cyclohexane dicarboxylic acid or isophthalic acid.

18. A composition according to claim 14 wherein said diol is butanediol-1,4.

19. A molding composition comprising the modified polyester of claim 1 and an additive.

20. A composition according to claim 19 wherein said said additive is a filler and said filler is present in an amount of 2 to 80 weight percent.

21. A composition according to claim 20 wherein said filler is present in an amount of 20 to 50 weight percent.

22. A composition according to claim 20 wherein said filler in glass sphere, glass powder, glass whiskers, asbestos fibers, carbon fibers, synthethic fibers, metal threads, metal chips, metal powder or mixtures thereof.

23. A composition according to claim 19 wherein said additive is a stabilizer, lubricant, dye, pigment or nucleating agent.

24. A method for preparing the modified polyester of claim 1 which comprises contacting a polyester itself being the condensation product of terephthalic acid or an ester forming derivative thereof and a diol with a diisocyanate, the polyester reactant having an arithmetical mean molecular weight $\overline{M}_n$ greater than 8,000 and a carboxyl equivalent of at least 10 mVal/kg.

25. A composition according to claim 24 wherein said process is conducted in the plastic state.

26. A composition according to claim 24 wherein a mixture of such polyesters is reacted with said diisocyanate and said polyesters having different molecular weights.

27. A composition according to claim 24 wherein said diisocyanate has a molecular weight of 168 to 500.

28. A composition according to claim 27 wherein said diisocyanate has the formula O=C=N—R—N=C=O.

29. A composition according to claim 28 wherein said diisocyanate is selected from the group consisting of hexamethylene diisocyanate, 4,4'-diisocyanatodiphenyl, 4,4'-diisocyanato-3,3'-dimethoxydiphenyl, 4,4'-diisocyanato-3,3'-dimethylidiphenyl, 4,4'-diisocyanato-3,3'-diphenyl-diphenyl, 4,4'-diisocyanatodiphenylmethane, 4,4'-diisocyanato-3,3'-dimethylidiphenylmethane, 1,5-diisocyanatonaphthaline, toluylenediisocyanate (2,4 and/or 2,6-diisocyanatotoluene) and m-xylylene diisocyanate.

30. A composition according to claim 24 wherein the carboxyl equivalent of the polyester which is reacted is up to 90 mVal/kg.

31. A composition according to claim 28 wherein said diisocyanate is 4,4'-diphenylmethane diisocyanate.

32. A composition according to claim 28 wherein said diisocyanate is used in such an amount that the content of bound nitrogen, determined as $N_1$ in the resultant product is less than 0.4 weight percent.

33. A composition according to claim 32 wherein the process is carried out at a temperature at which substantial reaction of the diisocyanate with the carboxyl groups is avoided.

34. A modified polyester according to claim 1 wherein said copolymer has an arithmetical mean molecular weight $\overline{M}_n$ of up to 35,000.

* * * * *